(12) United States Patent
Babcock et al.

(10) Patent No.: US 8,453,311 B2
(45) Date of Patent: Jun. 4, 2013

(54) SHEET-STACK CUTTING

(75) Inventors: Robert Lloyd Babcock, Milpitas, CA (US); Koji Shima, Saratoga, CA (US)

(73) Assignee: Seagate Technology LLC, Cupertino, CA (US)

( * ) Notice: Subject to any disclaimer, the term of this patent is extended or adjusted under 35 U.S.C. 154(b) by 1435 days.

(21) Appl. No.: 12/111,807

(22) Filed: Apr. 29, 2008

(65) Prior Publication Data
US 2009/0269154 A1 Oct. 29, 2009

(51) Int. Cl.
*B23P 13/04* (2006.01)

(52) U.S. Cl.
USPC ............ 29/558; 29/559; 269/9; 83/29

(58) Field of Classification Search
USPC .......... 29/557, 464, 466, 558, 559, 26 R, 29/281.5; 269/9, 24, 47, 49, 52, 54, 54.5; 83/29, 83/39, 50, 452; 408/36, 56, 57, 107; 451/375; 65/174
See application file for complete search history.

(56) References Cited

U.S. PATENT DOCUMENTS

| 3,356,360 A * | 12/1967 | Ward | 269/52 |
| 5,538,579 A * | 7/1996 | Ishimura et al. | 156/250 |
| 6,718,612 B2 * | 4/2004 | Bajorek | 29/424 |
| 7,107,672 B2 * | 9/2006 | Onitsuka et al. | 29/832 |
| 7,395,679 B2 * | 7/2008 | Mori et al. | 65/66 |
| 7,488,145 B2 * | 2/2009 | Watanabe et al. | 408/1 R |
| 2002/0053121 A1 * | 5/2002 | Bajorek | 29/424 |
| 2009/0261519 A1 * | 10/2009 | Piggott | 269/9 |
| 2011/0159319 A1 * | 6/2011 | Yamasaki et al. | 428/846.9 |

* cited by examiner

*Primary Examiner* — David Bryant
*Assistant Examiner* — Christopher Koehler
(74) *Attorney, Agent, or Firm* — Mitchell K. McCarthy; McCarthy Law Group

(57) ABSTRACT

A method of forming a batch of uniformly shaped glass sheet objects is disclosed. A stack of glass sheets is placed in a frame and submerged in a coolant. A hole is drilled through the stack. The cores of the hole and any debris from the drilling process are swept away in the coolant and pumped through a filter. A pin is inserted into the hole and attached to the base. A head on the pin, or a washer, fixes the stack of glass to the base at the hole. An outer profile is then cut in the glass stack around the hole while the formed objects are held to a base of the frame by the pin. Again, any debris is swept away in the coolant. The uniformly shaped objects are removed from the frame and separated. The glass sheet objects are preferably usable as a substrate for a magnetic or magneto-optical (MO) data/information storage retrieval medium.

19 Claims, 4 Drawing Sheets

SHEET-STACK CUTTING

BACKGROUND OF THE INVENTION

Magnetic recording media are widely used in various applications, particularly in the computer industry. The conventional recording medium typically includes a plurality of layers formed on a non-magnetic substrate. The substrate is most commonly disk-shaped and includes a bore through its center. In order to utilize as much of the substrate as possible, the inner and outer diameters of the disk-shaped substrate must meet stringent requirements. One material used for the substrate which is becoming increasingly popular is glass.

Glass substrates are typically produced using at least four processes, each of which is typically carried out at a different location and using different machinery. Glass sheets are first produced and used as bulk material. Solid disks are then cut out of the glass sheets. Subsequently, a bore is drilled through each disk. The surfaces of the disks are then polished to meet requirements prior to applying the layers. Each process requires additional manufacturing cost and the overall production of disk-shaped glass substrates is costly.

Bulk glass sheets are widely used and there is a large industry devoted to their production. As a result, there is also much competition between manufacturers driving the cost of sheets of glass down. Accordingly, it is more economical to buy large sheets of glass and cut the substrates out of those sheets than produce glass disks from scratch. Thus, it would be uneconomical to combine the process of producing the glass and shaping the glass in a single step.

Polishing glass disks for use as the substrates of recording media is carried out using very specific methods and tools in order to meet strict requirements necessary for depositing the remaining layers of the media on the substrate. Due to the specific tools required, there is no clear advantage of combining the polishing step with any of the other steps of manufacturing these substrates.

However, the inventors of the present invention have identified that the step of forming the solid glass disks and forming the bores in the glass disks are similar tasks, both involving cutting through the glass sheet to form a desired shape. Thus, the inventors identified that these steps should be combined in order to reduce manufacturing costs.

In addition to the cost disadvantage that is incurred by having the steps of making the solid disks and forming the bores be separate processes. The present method of forming substrates also suffers from variance between each substrate. Both the outer and inner diameters of the substrate may vary from one substrate to the next. Further, the location of the inner diameter with respect to the outer diameter may also vary from one substrate to the next. Accordingly, in order to meet the stringent requirements of recording media, each step of forming the outer diameter and the inner diameter must be carefully carried out for every substrate. Thus, there is also a need for a method that produces disk-shaped glass substrates in batches, so that the precise formation of the inner and outer diameter may be calculated less frequently.

Another challenge presented when forming glass substrates is that an excess of heat is produced when glass is machined. Thus, when the glass is drilled or cut it becomes very hot. Thermal stresses produced within the glass can lead to cracking within the disk rendering it unfit for use as a disk. Thermal stresses can be avoided by drilling the glass slowly allowing heat to dissipate. However, this slows production time, thereby increasing costs. Therefore, there is a need for a process that can produce glass substrates quickly without losing any considerable amount to cracking or damage.

SUMMARY OF THE INVENTION

The embodiments of the invention relate to a method of manufacturing a batch of glass substrates, comprising fixing a stack of sheets of glass into a frame, the frame having a base that includes at least one threaded bore, wherein the sheets of glass cover the threaded bore; submerging the stack of sheets of glass and the frame in a coolant; drilling at least one bore through the stack of sheets of glass to expose the at least one threaded bore, whereby debris is deposited in the coolant; positioning a threaded pin through the at least one bore of the stack of sheets; fixing the stack of sheets directly to the base using the threaded pin by inserting the threaded pin into the threaded bore; drilling at least one outer diameter of the batch of substrates around the at least one bore, whereby debris is deposited in the coolant; and pumping the coolant and debris deposited therein away from a vicinity of the stack of sheets of glass.

These and various other features and advantages will be apparent from a reading of the following detailed description.

BRIEF DESCRIPTION OF THE DRAWINGS

The following detailed description of the embodiments of the present invention can best be understood when read in conjunction with the following drawings, in which the features are not necessarily drawn to scale but rather are drawn as to best illustrate the pertinent features, wherein.

DETAILED DESCRIPTION OF THE PREFERRED EMBODIMENTS

Figure 1:
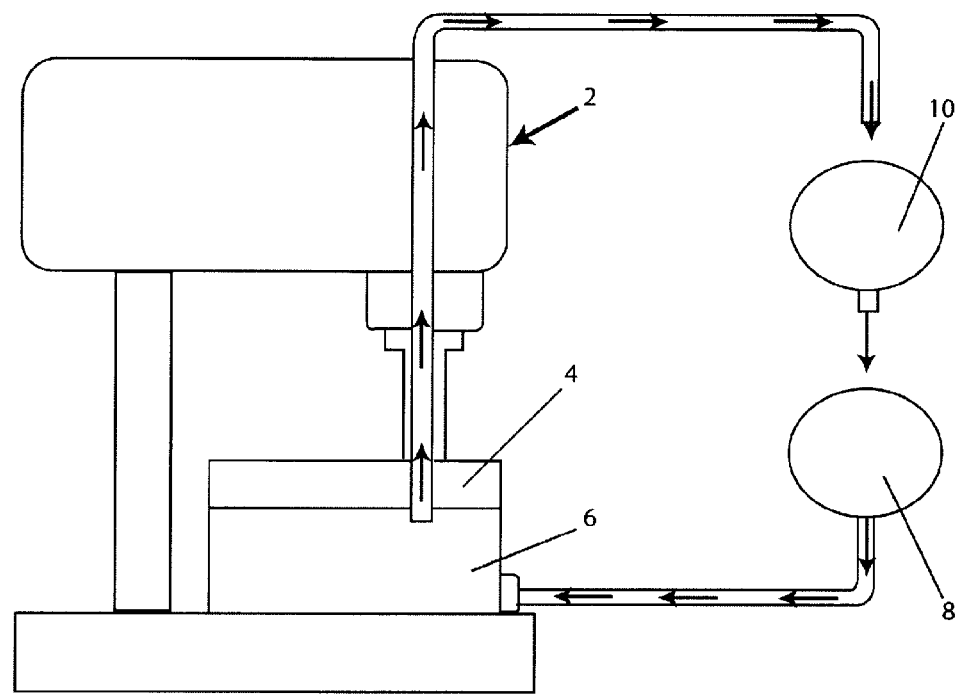
FIG. 1 shows a coring station for use with the method of the present invention.
Figure 2:
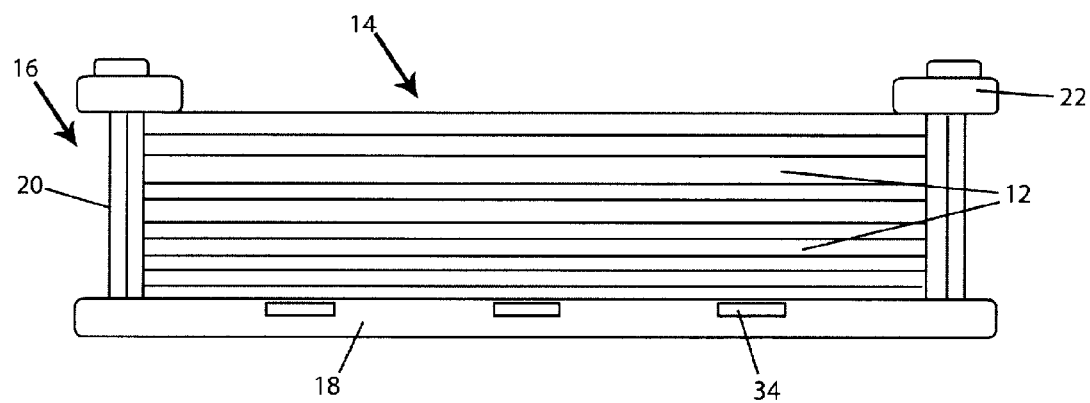
FIG. 2 shows a stack of glass sheets held in a frame.

The invention relates to a method of manufacturing batches of uniformly shaped glass sheet objects from a stack of glass sheets. The invention has particular utility in fabrication of disk-shaped glass substrates for use in the manufacture of magnetic data/information storage and retrieval media, e.g., hard disks.

In one embodiment, the invention provides a method of manufacturing at least one batch of identically shaped glass sheet objects. A stack of glass sheets is fixed in a frame that includes a base under the bottom sheet of glass. The stack of glass sheets and the frame are submerged in a tank of coolant. For each batch that is produced, a bore is drilled through the stack down to the base. A pin is then positioned in the bore and fixed to the base. The pin holds the stack of glass sheets to the base at the location of the bore. The glass sheets are then cut in an outer profile around each of the bores to form one or more batches of glass sheet objects having the outer profile. While the cutting process occurs, the glass sheets remained fixed to the base by the pin. During both the drilling and the cutting process, the coolant is pumped away from the vicinity of the glass sheets to carry away any debris formed during those steps.

In another embodiment, the invention provides a method of manufacturing at least one batch of disk-shaped glass substrates. A stack of glass sheets is fixed in a frame that includes a base under the bottom sheet of glass, with a threaded bore for each batch that is to be produced. The stack of glass sheets and the frame are submerged in a tank of coolant. For each batch that is produced, a bore is drilled through the stack down to the base exposing the threaded bore. A threaded pin is then positioned through the bore in the glass and fixed to the threaded bore in the base. The pin holds the stack of glass sheets to the base. An outer diameter of the disk-shaped substrates in each batch is then cored around each of the bores using a drill. While the drilling of the outer diameters occurs, the glass sheets remained fixed to the base via the threaded pin. During both processes, the coolant is pumped away from the vicinity of the glass sheets to carry away any debris formed while drilling.

The present invention provides a method for manufacturing batches of glass sheet objects having a hole located therein. Both the hole and outer profile in each object is formed in a single manufacturing station. Thus, manufacturing costs are reduced by avoiding the use of two separate apparatuses: one for forming the hole and another for forming the outer profile. As a further advantage, a plurality of the glass sheet objects is formed simultaneously, increasing uniformity and further reducing production costs.

The invention is described with reference to a specific embodiment for forming disk-shaped glass sheets for use as substrates in the manufacture of thin film, high areal density magnetic and/or magneto-optical (MO) recording media. However, it will be evident to those of skill in the art that the present invention may be used to provide glass sheet objects having a variety of shapes for numerous different applications.

A coring station for use with the method of the invention is shown in FIG. 1. The coring station includes a drill press 2 positioned over a tank 4 filled with a liquid coolant 6. The coolant is circulated through the coring station by a pump 8. During its circulation, the coolant passes through a filter 10 where debris and other matter discussed below pass are cleaned out of the coolant fluid. In the embodiment illustrated in FIG. 1, the coolant path is directed through the drill press 2 itself. This embodiment is advantageous in that the any debris deposited into the coolant by action of the drill will be removed immediately directly from the location of its formation. However, this feature is not required and it is foreseeable that the coolant path may be entirely independent of the drill press 2 circulating from the tank 4 directly through the filter 10 and pump 8.

In accordance with the present invention, a number of glass sheets 12 are held in a stack 14 tightly secured within a frame 16. The frame 16 includes a base 18, side bars 20 and caps or cross bars 22. The stack 14 is placed above base 18 inside of side bars 20 and cross bars 22 are placed at the top of side bars 20 sandwiching the stack 14 of glass sheets 12 between the base 18 and the side bars 20. The combination of side bars 20 and cross bars 22 ensure that the sheets 12 cannot be removed from the base 18, either individually or as a stack 14. As an alternative to the side bars 20 and cross bars or caps 22, the frame may also be formed with complete side walls and a circumferential cap having an aperture therethrough.

Figure 3:
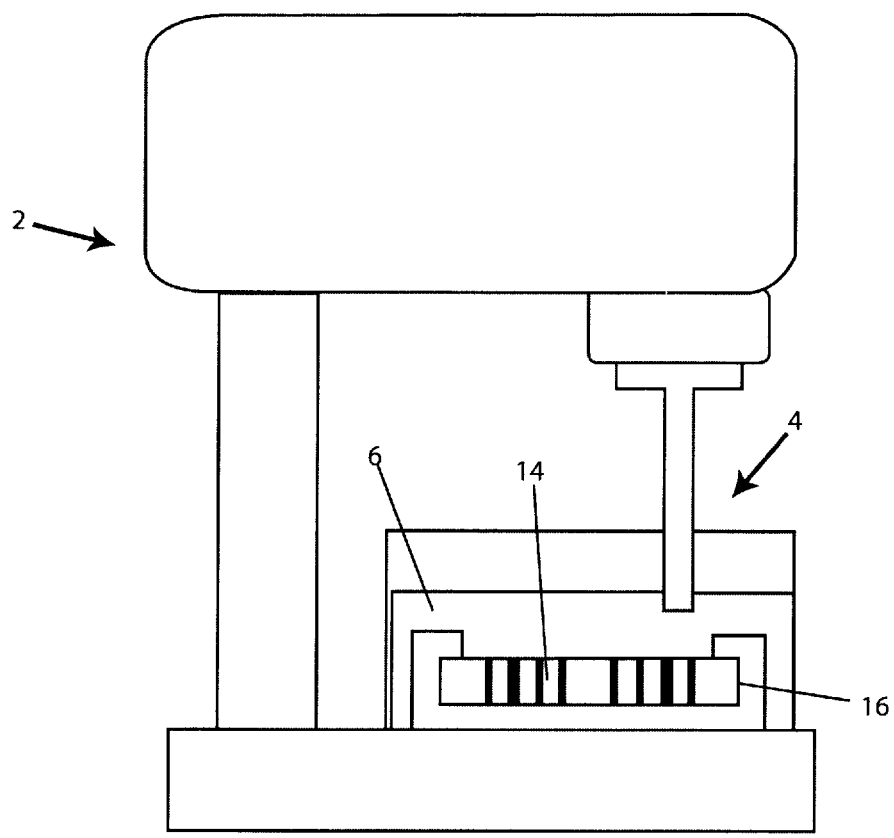
FIG. 3 shows the stack of glass sheets within the coring station.

The stack 14 of glass sheets 12 and the frame 16 are placed in the tank 4 as shown in FIG. 3 and submerged in the coolant. (The filter 10, pump 8 and coolant path have been omitted from FIG. 3, but are included in the operational embodiment.) In a preferred embodiment of the invention, the sheets of glass 12 are placed in the tank and submerged in the coolant 6 as a stack 14 within frame 16. However, it is also within the scope of the invention for the frame 16 to first be placed within the tank 4 followed by the sheets of glass 12.

Figure 4:
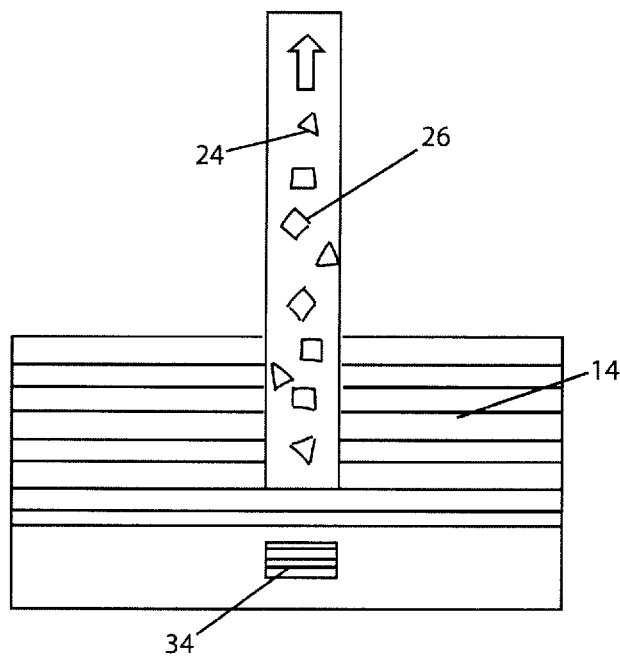
FIG. 4 illustrates a step of forming a hole in the sheets.

Once the stack 14 of glass sheets 12 are within the tank 4 of coolant 6, the drill press 2 is used to drill at least one bore for each batch of substrates, or objects, that are to be produced. The process of drilling a bore is shown in FIG. 4. As the press 2 drills through the glass, any heat generated during that process is dissipated in the coolant. Accordingly, the inventive method machines the glass objects at lower temperatures. At these temperatures, fewer thermal stresses are produced in the glass and the glass is less likely to be damaged. Further, while the drill forms the bore in the glass sheets 12, debris 24 is deposited into the coolant 6. By circulating the coolant 6 through the coring station 2, the debris 24 is moved away from the vicinity of the glass sheets 12. In the present embodiment, which includes a filter 10, the debris 24 is removed from the coolant by the filter 10. If the bores are formed with a coring drill, the cores 26 too may be removed in the coolant 6. As shown in FIG. 4, the coolant may be circulated through the drill press 2. A preferred range for the size of the bore is between 3 and 30 millimeters. However, other size bores may also be used within the scope of the invention.

Figure 5:
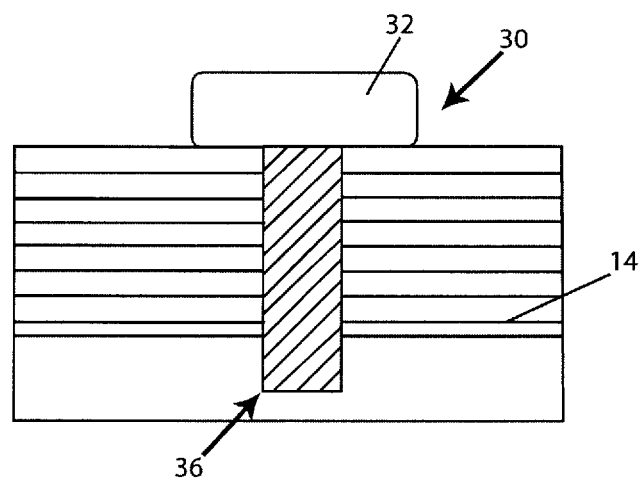
FIG. 5 shows a pin inserted into the hole.

After the bore is formed in the stack, the stack 14 of glass sheets 12 is then anchored to the base 18 of the frame 16 at the location of the bore. A pin 30 is inserted into the bore and used to fix the sheets 12 to the base. The pin 30 may include a head 32 that holds the sheets 12 to the base 18. For instance, the stack 14 of glass sheets 12 may be sandwiched between the head 32 of pin 30 and the base 18. FIG. 5 shows a stack 14 of glass sheets 12 fixed to base 18 using pin 30. In this illustrated embodiment, the head 32 is shown as a solid circumferential flange that is wider than the bore. However, the invention is not limited to this embodiment. For instance, the head 32 may include a flange that is smaller than the bore along with a washer between the flange and the glass sheets 12. Alternatively, the head may only project in one direction, resembling an "L" shape.

As stated above, the bottom of pin 30 is fixed to the base 18. In a preferred embodiment, the base 18 includes a connector 34 for attaching to a corresponding connector 36 on the pin 30. In this embodiment, the connector 34 of the base 18 should be exposed when the bore is formed in the stack 14 of sheets 12. In the illustrated embodiment, the connector of the base 18 is a threaded hole and the corresponding connector 36 is threading on the pin 30. Alternatively, the connectors may be a quick connect fitting, such as that on a spark plug, and include a bulb that fits into a casing. In another embodiment, the base does not include a connector 34. Instead, the pin 30 may fix itself to the base. For example, the pin 30 may include a screw at its bottom and screw directly into base 18.

Figure 6:
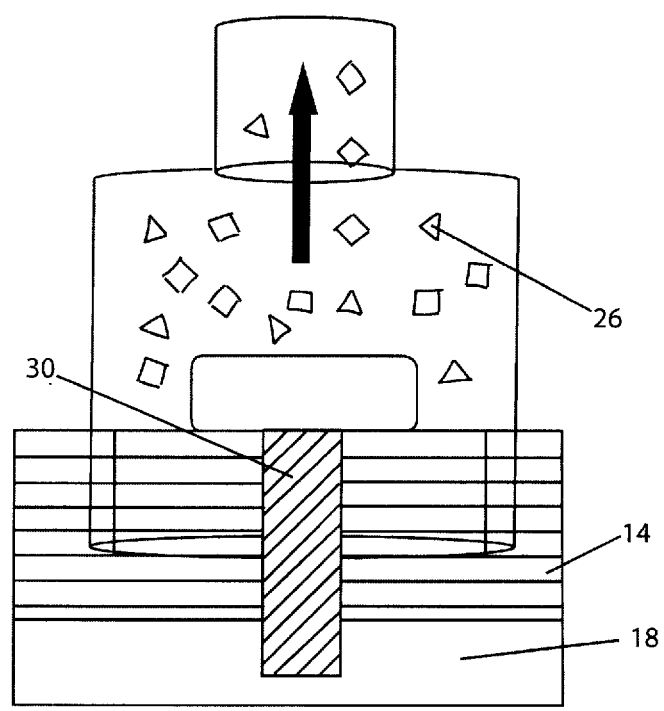
FIG. 6 illustrates a step of coring an outer diameter around the pin.

Once the pin or pins 30 are secured into the base 18, the stack 14 of sheets 12 is securely fixed to the base 18 at the bore and no longer require the remainder of the frame 16 to keep them in place. At this point, the outer profile of the objects may be cut in the glass sheets 12. For example, in the embodiment shown in FIG. 6, the drill press 2 cores an outer diameter around the bore. As the drill press is operated, debris 26 is deposited into the coolant 6 and carried away from the vicinity of the glass sheets 12 by the pumping action. A preferred range of outer diameter sizes is between 20 and 100 mm. However, the outer diameter may be of other sizes and still be within the scope of the invention. Further, the invention does not require that the outer profile be a circle that is cored by a drill. Instead, the outer profile may be square or triangular, with edges of the profile cut away.

Once the outer profile has been cut, or cored, the formation of the glass sheet objects is completed. Accordingly, the stack 14 may be removed from the coolant 6, the pin 30 taken out of the base 18, the glass sheets rinsed, and the glass objects or disks may be separated. These steps may be performed in any order, except that the pin should be removed prior to separating the glass disks.

One particular advantage of the invention, is that the formation of the glass objects takes place in the same location. Further, it is also advantageous that a single drill press may be used to form both the bore of the substrate and the outer diameter. In addition, it is also advantageous that the boring step, the pin placement and the formation of the outer diameter may all take place without the stack of sheets moving. As a result, the placement of the bore, and of the outer diameter with respect to the bore may be more precise.

As shown, the present invention advantageously provides, as by processing techniques which can be reliably practiced at low cost, improved methodologies and instrumentalities for forming bored glass disks to yield substrates with reliable inner and outer dimensions facilitating their use as substrates for high areal density thin film magnetic and/or MO recording media.

In the previous description, numerous specific details are set forth, such as specific materials, structures, reactants, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein. The implementations described above and other implementations are within the scope of the following claims.

We claim:

1. A method of manufacturing a batch of glass substrates, comprising:
    supporting a stack of glass sheets on a base;
    cutting the stack of glass sheets along a predetermined bore defining a hole in each of the glass sheets in the stack;
    after the cutting along the bore, connecting the stack of glass sheets to the base via a connecting member passing through the holes in each of the glass sheets in the stack; and
    after the connecting and without repositioning the stack of glass sheets relative to the base after cutting along the bore, cutting the stack of glass sheets along a predetermined periphery.

2. The method of claim 1 characterized by the stack of glass remaining stationary relative to the base from the supporting the stack of glass sheets on the base to the end of cutting along the periphery.

3. The method of claim 1 wherein the connecting is characterized by threadingly engaging a distal end of the connecting member with the base.

4. The method of claim 1 wherein the connecting is characterized by a proximal end of the connecting member compressingly engaging the stack of glass sheets against the base.

5. The method of claim 1 wherein the cutting along the periphery is characterized by coring an outer diameter concentrically around the bore.

6. The method of claim 1 wherein the cutting steps are characterized by cooling a cutting device with a coolant.

7. The method of claim 6 wherein the cooling is characterized by recirculating the coolant through a filter.

8. The method of claim 1 wherein the supporting is characterized by placing the stack of glass sheets in a frame.

9. The method of claim 8 further comprising, after placing the stack of glass sheets in the frame, placing the frame in a coolant tank.

10. The method of claim 1 wherein at least one of the cuttings is characterized by drilling.

11. A method of manufacturing a batch of objects from a sheet of material, comprising:
    connecting a stack of material sheets to a base with a first connecting member;
    after the connecting with the first connecting member, cutting the stack of material sheets along a predetermined bore defining a hole through each of the material sheets in the stack;
    after the cutting along the bore, connecting the stack of material sheets to the base with a different second connecting member passing through the hole in each of the material sheets in the stack;
    after the connecting with the second connecting member, removing the first connecting member; and
    after the removing the first connecting member and without repositioning the stack of material relative to the base after cutting along the bore, cutting the stack of material sheets along a periphery.

12. The method of claim 11 characterized by the stack of material sheets remaining stationary relative to the base from the connecting the stack of material sheets to the base to the end of cutting along the periphery.

13. The method of claim 11 wherein the connecting with the second connecting member is characterized by threadingly engaging a distal end of the second connecting member with the base.

14. The method of claim 11 wherein the connecting with the second connecting member is characterized by a proximal end of the second connecting member compressingly engaging the stack of material against the base.

15. The method of claim 11 wherein the cutting along the periphery is characterized by coring an outer diameter concentrically around the bore.

16. The method of claim 11 wherein the cutting steps are characterized by cooling a cutting device with a coolant.

17. The method of claim 16 wherein the cooling is characterized by recirculating the coolant through a filter.

18. The method of claim 11 wherein the connecting with the first connector is characterized by connecting the stack of material to a frame.

19. The method of claim 18 further comprising, after connecting the stack of material to the frame, placing the frame in a coolant tank.

* * * * *